US00RE48905E

(19) United States
(12) Reissued Patent
Liu et al.

(10) Patent Number: US RE48,905 E
(45) Date of Reissued Patent: Jan. 25, 2022

(54) ELECTROLYTES FOR CAPACITORS

(71) Applicant: Greatbatch Ltd., Clarence, NY (US)

(72) Inventors: Yanming Liu, Simpsonville, SC (US); Ashish Shah, East Amherst, NY (US)

(73) Assignee: Greatbatch Ltd., Clarence, NY (US)

(21) Appl. No.: 14/534,357

(22) Filed: Nov. 6, 2014

Related U.S. Patent Documents

Reissue of:
(64) Patent No.: 6,687,117
Issued: Feb. 3, 2004
Appl. No.: 10/354,324
Filed: Jan. 30, 2003

U.S. Applications:
(60) Provisional application No. 60/353,895, filed on Jan. 31, 2002.

(51) Int. Cl.
*H01G 9/022* (2006.01)
*H01G 9/15* (2006.01)

(52) U.S. Cl.
CPC ..... *H01G 9/022* (2013.01); *H01G 9/15* (2013.01)

(58) Field of Classification Search
CPC ..... H01G 9/15; H01G 9/022
See application file for complete search history.

(56) References Cited

U.S. PATENT DOCUMENTS

| | | | | |
|---|---|---|---|---|
| 2,089,687 | A | 8/1937 | Clark et al. | |
| 2,749,487 | A | 6/1956 | Jenny et al. | |
| 3,638,077 | A | 1/1972 | Chesnot | |
| 4,476,517 | A | 10/1984 | Fresia | |
| 4,559,581 | A | 12/1985 | Eijkelenkamp et al. | |
| 4,762,630 | A | 8/1988 | Shinozaki et al. | |
| 4,774,011 | A | 9/1988 | Mori et al. | |
| 4,885,115 | A | 12/1989 | Yokoyama et al. | |
| 5,111,365 | A | 5/1992 | Dapo | |
| 5,369,547 | A | 11/1994 | Evans | |
| 5,496,481 | A | 3/1996 | Liu | |
| 5,507,966 | A | 4/1996 | Liu | |
| 5,629,829 | A * | 5/1997 | Ikeya | 361/505 |
| 5,870,275 | A | 2/1999 | Shiono et al. | |
| 6,219,222 | B1 * | 4/2001 | Shah | H01G 9/022 361/506 |
| 6,261,434 | B1 | 7/2001 | Melody et al. | |
| 6,285,543 | B1 | 9/2001 | Komatsu et al. | |
| 6,368,485 | B1 | 4/2002 | Ue et al. | |
| 6,687,117 | B2 | 2/2004 | Liu et al. | |
| 2003/0142464 | A1 | 7/2003 | Liu et al. | |

FOREIGN PATENT DOCUMENTS

| | | |
|---|---|---|
| EP | 0989572 | 3/2000 |
| WO | 0033338 | 6/2000 |

OTHER PUBLICATIONS

Decision, Institution of Inter Partes Review, Case IPR2014-01361, U.S. Pat. No. 6,687,117 B2, Feb. 19, 2015.
"Patent Owners List of Exhibits", Case IPR2014-01361, U.S. Pat. No. 6,687,117, May 7, 2015.
"Patent Owners Motion To Amend The 117 Patent Under 37 CFR 42.121", Case IPR2014-01361, U.S. Pat. No. 6,687,117, May 7, 2015.
"Patent Owners Response", Case IPR2014-01361, U.S. Pat. No. 6,687,117, May 7, 2015.
Evans, "A 170 Volt Tantalum Hybrid Capacitor—Engineering Considerations", Presented at the 7th International Seminar on Double Layer Capacitors and Similar Energy Storage Devices, Dec. 8-10, 1997, Dec. 1997.
Evans, et al., "Tantalum Hybrid Capacitors—The Capacitors with the Highest Available Power Density in Medium Voltage Range", Presented at the 19th International Seminar on Double Layer Capacitors and Hybrid Energy Storage Devices, Dec. 7-9, 2009, Deerfield Beach, FL, Dec. 2009.
Exhibit-2007, "USPTO Patent Full-Text and Image Database", Searching US Patent Collection.
Final Decision, *AVX Corporation* v. *Greatbatch Ltd* Case IPR2014-01361 U.S. Pat. No. 6,687,117, Dec. 30, 2015, 1-19.
"Notice of Filing Date Accorded to Petition and Time for Filing Patent Owner Preliminary Response", *AVX Corporation* v. *Wilson Greatbatch Technologies, Inc.,*, Aug. 27, 2014.
"Patent Owners Corrected Mandatory Notices", *AVX Corporation* v. *Wilson Greatbatch Technologies, Inc,* Sep. 11, 2014.
"Patent Owners Preliminary Response", *AVX Corporation* v. *Wilson Greatbatch Technologies, Inc.,* Nov. 26, 2014.
"Petition for Inter Parties Review of U.S. Pat. No. 6,687,117", IPR2014-01361, Aug. 21, 2014.
"Petitioner's Motion to Stay Related Reissue Proceeding", *AVX Corporation* v. *Greatbatch, Ltd.,* Jun. 16, 2015.
"Petitioner's Power of Attorney for an Inter Partes Review", *AVX Corporation* v. *Greatbatch Ltd.,* Aug. 21, 2014.
"Power of Attorney Statement under 37 CFR 3.73(c)", *AVX Corporation* v. *Greatbatch Ltd.,* Feb. 4, 2015.
"Scheduling Order", *AVX Corporation* v. *Greatbatch Ltd.,* Feb. 19, 2015.
"Supplemental Patent Owners Mandatory Notices", *AVX Corporation* v. *Wilson Greatbatch Technologies, Inc.,* Nov. 24, 2014.
Exhibit 1010, "Prosecution History of U.S. Appl. No. 10/354,324", *AVX Corporation* v. *Greatbatch Inc.,* Aug. 21, 2014.
Exhibit 1011, "U.S. Appl. No. 60/353,895", *AVX Corporation* v. *Greatbatch Inc.,* Aug. 21, 2014.
Exhibit 3001, "4-NITROBENZOIC Acid", Pub Chem Open Chemistry; Open Chemistry Database U.S. National Library of Medicine, National Center for Biotechnology Information, *AVX Corporation* v. *Greatbatch Ltd.,* Case IPR2014-01361, Jun. 18, 2015.

* cited by examiner

*Primary Examiner* — Norca L. Torres Velazquez
(74) *Attorney, Agent, or Firm* — Michael F. Scalise

(57) ABSTRACT

The present invention is directed to an electrolyte for an electrolytic capacitor. The capacitor has an electrolytic anode and an electrochemical cathode. The electrolyte has water, a water soluble organic salt, and a relatively weak organic acid. This electrolyte is chemically compatible to aluminum and tantalum oxide dielectrics and withstands higher voltage while maintaining good conductivity. This makes the electrolyte especially useful for high voltage applications, such as occur in an implantable cardiac defibrillator.

28 Claims, No Drawings

ELECTROLYTES FOR CAPACITORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

This application *is a reissue of application Ser. No. 10/354,324, filed on Jan. 30, 2003, now U.S. Pat. No. 6,687,117, which* claims priority from U.S. provisional application Ser. No. 60/353,895, filed on Jan. 31, 2002.

BACKGROUND OF THE INVENTION

This invention is directed to an electrolyte for electrolytic capacitors. More particularly, the present invention relates to an electrolyte for high voltage wet tantulum or aluminum capacitors.

SUMMARY OF THE INVENTION

The present electrolyte is suitable for an electrolytic capacitor and includes water and an organic solvent having an ammonium salt of a relatively weak organic acid dissolved therein. The organic acid is used to achieve an appropriate pH, conductivity, and breakdown voltage for a particular capacitor application.

An exemplary capacitor includes an anode of a valve metal such as aluminum or tantalum provided with an oxide film on the surface as a dielectric. The oxide film is typically formed by an anodizing process. The anode is kept from contacting a cathode by a separator disposed there between. The separator is impregnated with the present electrolyte. The electrolyte has a relatively high conductivity and breakdown voltage, which ensures that the capacitor exhibits low series resistance while withstanding high voltage. As such, the electrolyte impregnated separator provides the conductivity between the anode and the cathode while supporting the rated voltage. The electrolyte impregnated separator also helps heal the dielectric oxide film on the anode during operation.

These and other aspects and advantages of the present invention will become increasingly more apparent to those skilled in the art by reference to the following description.

DETAILED DESCRIPTION OF THE PREFERRED EMBODIMENTS

An electrolyte according to the present invention preferably contains the following constituents, by weight: about 1% to about 80% de-ionized water and 0% to about 80% of an organic solvent along with about 1% to about 80% isobutyric acid and about 0.5% to about 50% of concentrated ammonium salt (28%). The organic solvent includes, but is not limited to, glycols, glycol ethers, polyethylene glycols, amides, esters, nitriles, linear carbonates, cyclic carbonates, and mixtures thereof.

Suitable glycols include, but are not limited to, ethylene glycol, diethylene glycol, propylene glycol, trimethylene glycol, and mixtures thereof.

Suitable glycol ethers include, but are not limited to, ethylene glycol monomethyl ether, ethylene glycol monoethyl ether, propylene glycol methyl ether, diethylene glycol methyl ether, dipropylene glycol methyl ether, glycol monobutyl ether, and mixtures thereof.

Suitable amides include formamide, dimethyl formamide, diethyl formamide, ethyl formamide, dimethyl acetamide, methyl acetamide, and mixtures thereof.

Suitable nitriles include acetonitrile, propionitrile, and mixtures thereof.

Cyclic esters such as γ-butyrolactone, γ-valerolactone and N-methyl-2-pyrrolidone are also useful solvents or co-solvents as are carbonates, both linear and cyclic. Suitable linear and cyclic carbonates include dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.

Isobutyric acid can act as both a solvent and a solute. While isobutyric acid is preferred, other relatively weak organic acids of the general formula of $c_nH_{2+n}O_2$ (where n=2 to 7) are acceptable. Examples are butyric acid, propionic acid, valeric acid (pentanoic acid), methylbutyric acid, trimethylacetic acid, and mixtures thereof, among others coming under the purview of the above formula.

Ammonium hydroxide is added to react with the acid to form an ammonium salt in situ that provides electrical conductivity. Electrolyte pH and conductivity can be adjusted by the amount of ammonium hydroxide. Ammonium hydroxide can be substituted by an ammonium salt of the corresponding acid constituent. Examples of these salts are ammonium isobutyrate, ammonium butyrate, ammonium propionate, ammonium valerate, ammonium methylbutyrate, ammonium trimethylacetate, and mixtures thereof.

The electrolytes of the present invention are useful for not only conventional electrolytic capacitors, but also those of the electrolytic/electrochemical hybrid type. Capacitor cathodes commonly used in electrolytic capacitors include etched aluminum foil in aluminum electrolytic capacitors, and those commonly used in wet tantalum capacitors such as of silver, sintered valve metal powders, platinum black, and carbon. The cathode of hybrid capacitors include a pseudocapacitive coating of a transition metal oxide, nitride, carbide or carbon nitride, the transition metal being selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel. The pseudocapacitive coating is deposited on a conductive substrate such as of titanium or tantalum. The electrolytic/electrochemical hybrid capacitor has high energy density and is particularly useful for implantable medical devices such as a cardiac defibrillator.

The anode is of a valve metal consisting of the group vanadium, niobium, tantalum, aluminum, titanium, zirconium and hafnium. The anode can be a foil, etched foil, sintered powder, or any other form of porous substrate of these metals.

A preferred chemistry for a hybrid capacitor comprises a cathode electrode of a porous ruthenium oxide film provided on a titanium substrate coupled with an anode of a sintered tantalum powder pressed into a pellet. The cathode and anode electrodes are segregated from each other by a suitable separator material impregnated with the present working electrolyte. Such a capacitor is described in U.S. Pat. Nos. 5,894,403, 5,920,455 and 5,926,632. These patents are assigned to the assignee of the present invention and incorporated herein by reference.

Electrolytes of present invention may also contain phosphoric acid, an inorganic phosphate or an organic phosphate as an additive to improve anode stability. The examples of organic phosphates are trimethylphosphate, triethylphosphate, triisopropylphosphate, and mxtures thereof.

Finally, electrolytes of present invention may contain a nitroaromatic depolarizer to prevent cathodic gassing during operation. Suitable nitroaromatic compounds include, but are not limited to 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof.

The present electrolyte is useful for capacitors having an operating range of about 175 volts to about 400 volts while maintaining high conductivity. The preferred ruthenium oxide/tantalum hybrid capacitor provides high energy density at voltages of at least about 175 volts, such as is required in an implantable medical device, for example, a cardiac defibrillator. For this reason, it is important that the electrolyte have a high breakdown voltage, high conductivity, suitable pH and good chemical stability over the operating life of the device.

The present electrolyte is chemically compatible over time with the other capacitor components and capacitor materials, even at temperatures of about 105° C. This means that the electrolyte does not generate gas or promote corrosion of the other capacitor components at that temperature.

The following examples describe the manner and process of a capacitor according to the present invention, and they set forth the best mode contemplated by the inventors of carrying out the invention, but they are not to be construed as limiting.

EXAMPLE I

One exemplary electrolyte according to the present invention consists of the constituents listed in Table 1. The anode breakdown voltage measurements set forth in the below tables were conducted using a tantalum anode at room temperature.

TABLE 1

| Components | Wt. % | Amount |
|---|---|---|
| ethylene glycol | 39.17 | 89.8 (ml) |
| deionized water | 52.88 | 135.0 (ml) |
| isobutyric acid | 6.0 | 16.1 (ml) |
| ammonium hydroxide (28%) | 1.5 | 4.3 (ml) |
| phosphoric acid (85%) | 0.06 | 0.09 (ml) |
| p-nitrophenol | 0.4 | 1.0 (g) |

It was determined that the above electrolyte had the physical characteristics listed in Table 2.

TABLE 2

| | |
|---|---|
| pH | 4.9 |
| Conductivity | 7.1 mS/cm |
| Anode Breakdown | 395 volts |

EXAMPLE II

Another exemplary electrolyte according to the present invention consists of the constituents listed in Table 3.

TABLE 3

| Components | Wt. % | Amount |
|---|---|---|
| ethylene glycol | 39.71 | 359.4 (ml) |
| deionized water | 55.6 | 560.0 (ml) |
| isobutyric acid | 3.0 | 31.6 (ml) |
| ammonium hydroxide (28%) | 1.3 | 14.0 (ml) |
| phosphoric acid (85%) | 0.06 | 0.36 (ml) |
| p-nitrophenol | 0.4 | 4.0 (g) |

It was determined that the above electrolyte had the physical characteristics listed in Table 4.

TABLE 4

| | |
|---|---|
| pH | 5.4 |
| Conductivity | 6.9 mS/cm |
| Anode Breakdown | 400 volts |

EXAMPLE III

Another exemplary electrolyte according to the present invention consists of the constituents listed in Table 5.

TABLE 5

| Components | Wt. % | Amount |
|---|---|---|
| ethylene glycol | 18.2 | 18.0 (ml) |
| deionized water | 9.1 | 10.0 (ml) |
| isobutyric acid | 64.5 | 74.7 (ml) |
| ammonium hydroxide (28%) | 8.2 | 10.0 (ml) |
| phosphoric acid (85%) | 0.09 | 0.06 (ml) |

It was determined that the above electrolyte had the physical characteristics listed in Table 6.

TABLE 6

| | |
|---|---|
| pH | 5.2 |
| Conductivity | 7.9 mS/cm |
| Anode Breakdown | 388 volts |

EXAMPLE IV

Another exemplary electrolyte according to the present invention consists of the constituents listed in Table 7.

TABLE 7

| Components | Wt. % | Amount |
|---|---|---|
| deionized water | 44.88 | 100.0 (ml) |
| isobutyric acid | 13.5 | 31.6 (ml) |
| ammonium hydroxide (28%) | 3.2 | 8.0 (ml) |
| phosphoric acid (85%) | 0.04 | 0.06 (ml) |
| ethylene glycol monomethyl ether | 38.2 | 91.4 (ml) |

It was determined that the above electrolyte had the physical characteristics listed in Table 8.

TABLE 8

| | |
|---|---|
| pH | 5.7 |
| Conductivity | 11.5 mS/cm |
| Anode Breakdown | 380 volts |

EXAMPLE V

Another exemplary electrolyte according to the present invention consists of the constituents listed in Table 9.

TABLE 9

| Components | Wt. % | Amount |
|---|---|---|
| deionized water | 4.69 | 10.0 (ml) |
| isobutyric acid | 37.5 | 84.2 (ml) |
| ammonium hydroxide (28%) | 10.6 | 25.0 (ml) |
| phosphoric acid (85%) | 0.05 | 0.06 (ml) |
| ethylene glycol monomethyl ether | 46.9 | 107.5 (ml) |

It was determined that the above electrolyte had the physical characteristics listed in Table 10.

TABLE 10

| | |
|---|---|
| pH | 6.7 |
| Conductivity | 10.8 mS/cm |
| Anode Breakdown | 370 volts |

It is appreciated that various modifications to the present inventive concepts described herein may be apparent to those of ordinary skill in the art without departing from the spirit and scope of the present invention as defined by the herein appended claims.

What is claimed is:

~~1. An electrolyte for an electrical energy storage device, the electrolyte consisting essentially of:~~

~~a) water;~~

~~b) an organic acid; and~~

~~c) an ammonium salt of the organic acid.~~

~~2. The electrolyte of claim 1 wherein the water present in a range of, by weight, anout 1% to about 80%.~~

~~3. The electrolyte of claim 1 wherein the acid has the general formula of $c_nH_{2+n}O_2$ (where n=2 to 7).~~

~~4. The electrolyte of claim 1 wherein the acid is selected from the group consisting of isobutyric acid, butyric acid, propionic acid, valeric acid, methylbutyric acid, trimethylacetic acid, and mixtures thereof.~~

~~5. The electrolyte of claim 1 wherein the acid is present in a range of, by weight, about 1% to about 80%.~~

~~6. The electrolyte of claim 1 wherein the ammonium salt is selected from the group consisting of ammonium isobutyrate, ammonium butyrate, ammonium propionate, ammonium valerate, ammonium methylbutyrate, ammonium trimethylacetate, and mixtures thereof.~~

~~7. The electrolyte of claim 1 wherein the ammonium salt is present in a range of, by weight, 0.5% to about 50%.~~

~~8. An electrolyte for a capacitor, the electrolyte comprising:~~

~~a) water;~~

~~b) an organic solvent;~~

~~c) an organic acid; and~~

~~d) an ammonium salt of the organic acid.~~

~~9. The electrolyte of claim 8 wherein the organic solvent is selected from the group consisting of glycols, glycol ethers, polyethylene glycols, amides, esters, nitriles, linear carbonates, cyclic carbonates, and mixtures thereof.~~

~~10. The electrolyte of claim 9 wherein the glycol is selected from the group consisting of ethylene glycol, diethylene glycol, propylene glycol, trimethylene glycol, and mixtures thereof.~~

~~11. The electrolyte of claim 9 wherein the glycol ether is selected from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof.~~

~~12. The electrolyte of claim 9 wherein the amide is selected from the group consisting of formamide, dimethyl formamide, diethyl formamide, ethyl formamide, dimethyl acetamide, methyl acetamide, and mixtures thereof.~~

~~13. The electrolyte of claim 9 wherein the ester is selected from the group consisting of γ-butyrolactone, γ-valerolactone, N-methyl-2-pyrrolidone, and mixtures thereof.~~

~~14. The electrolyte of claim 9 wherein the nitrile is selected from the group consisting of acetonitrile, propionitrile, and mixtures thereof.~~

~~15. The electrolyte of claim 9 wherein the linear and cyclic carbonates are selected from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylene carbonate, vinylene carbonate, and mixtures thereof.~~

~~16. The electrolyte of claim 8 wherein the organic acid is selected from the group consisting of isobutyric acid, butyric acid, propionic acid, valeric acid, methylbutyric acid, trimethylacetic acid, and mixtures thereof.~~

~~17. The electrolyte of claim 8 wherein the ammonium salt is selected from the group consisting of ammonium isobutyrate, ammonium butyrate, ammonium propionate, ammonium valerate, ammonium methylbutyrate, ammonium trimethylacetate, and mixtures thereof.~~

~~18. A capacitor, which comprises:~~

~~a) an anode of a valve metal;~~

~~b) an electrochemical cathode selected from the group consisting of a transition metal oxide, a transition metal nitride, a transition metal carbide and a transition metal carbon nitride; and~~

~~c) an electrolyte for the anode and the cathode, the electrolyte comprising:~~

~~i) water;~~

~~ii) an organic solvent;~~

~~iii) an organic acid; and~~

~~iv) an ammonium salt of the organic acid.~~

~~19. The capacitor of claim 18 wherein the organic acid is selected from the group consisting of isobutyric acid, butyric acid, propionic acid, valeric acid, methylbutyric acid, trimethylacetic acid, and mixtures thereof.~~

~~20. The capacitor of claim 18 wherein the ammonium salt is selected from the group consisting of ammonium isobutyrate, ammonium butyrate, ammonium propionate, ammonium valerate, ammonium methylbutyrate, ammonium trimethylacetate, and mixtures thereof.~~

~~21. The capacitor of claim 18 wherein the organic solvent is selected from the group consisting of glycols, glycol ethers, polyethylene glycols, amides, esters, nitriles, linear carbonates, cyclic carbonates, and mixtures thereof.~~

~~22. The capacitor of claim 21 wherein the glycol is selected from the group consisting of ethylene glycol, diethylene glycol, propylene glycol, trimethylene glycol, and mixtures thereof.~~

~~23. The capacitor of claim 21 wherein the glycol ether is selected from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof.~~

~~24. The capacitor of claim 21 wherein the amide is selected from the group consisting of formamide, dimethyl formamide, diethyl formamide, ethyl formamide, dimethyl acetamide, methyl acetamide, and mixtures thereof.~~

~~25. The capacitor of claim 21 wherein the ester is selected from the group consisting of γ-butyrolactone, γ-valerolactone, N-methyl-2-pyrrolidone, and mixtures thereof.~~

~~26. The capacitor of claim 21 wherein the nitrile is selected from the group consisting of acetonitrile, propionitrile, and mixtures thereof.~~

~~27. The capacitor of claim 21 wherein the linear and cyclic carbonates are selected from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.~~

~~28. The capacitor of claim 18 wherein the valve metal is selected from the group consisting of tantalum, vanadium, niobium, aluminum, titanium, zirconium, hafnium, and mixtures thereof.~~

~~29. The capacitor of claim 18 wherein the transition metal is selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and mixtures thereof.~~

~~30. The capacitor of claim 18 wherein the cathode is of ruthenium oxide and the anode is of tanatlum.~~

~~31. The capacitor of claim 18 wherein the electrolyte includes at least one of the group consisting of phosphoric acid, trimethylphosphate, triethylphosphate, and triisopropylphosphate.~~

~~32. The capacitor of claim 18 wherein the electrolyte includes a nitroaromatic compound selected from the group consisting of 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof.~~

~~33. A method for providing an electrolyte, consisting essentially of the steps of:~~

~~a) providing water;~~

~~b) providing an organic acid; and~~

~~c) providing an ammonium salt of the organic acid.~~

~~34. The method of claim 33 including selecting the organic acid from the group consisting of isobutyric acid, butyric acid, propionic acid, valeric acid, methylbutyric acid, trimethylacetic acid, and mixtures thereof.~~

~~35. The method of claim 33 including providing ammonium hydroxide therein to provide the ammonium salt.~~

~~36. The method of claim 33 including selecting the ammonium salt from the group consisting of ammonium isobutyrate, ammonium butyrate, ammonium propionate, ammonium valerate, ammonium methylbutyrate, ammonium trimethylacetate, and mixtures thereof.~~

~~37. The method of claim 33 further including an organic solvent selected from the group consisting of glycols, glycol ethers, polyethylene glycols, amides, esters, nitriles, linear carbonates, cyclic carbonates, and mixtures thereof.~~

~~38. The method of claim 37 including selecting the glycol from the group consisting of ethylene glycol, diethylene glycol, propylene glycol, trimethylene glycol, and mixtures thereof.~~

~~39. The method of claim 37 including selecting the glycol ether from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof.~~

~~40. The method of claim 37 including selecting the amide from the group consisting of formamide, dimethyl formamide, diethyl formamide, ethyl formamide, dimethyl acetamide, methyl acetamide, and mixtures thereof.~~

~~41. The method of claim 37 including selecting the ester from the group consisting of γ-butyrolactone, γ-valerolactone, N-methyl-2-pyrrolidone, and mixtures thereof.~~

~~42. The method of claim 37 including selecting the nitrile from the group consisting of acetonitrile, propionitrile, and mixtures thereof.~~

~~43. The method of claim 37 including selecting the linear and cyclic carbonates from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylenes carbonate, vinylene carbonate, and mixtures thereof.~~

*44. An electrolyte for a capacitor comprising a tantalum anode, the electrolyte consisting of:*

*a) water;*

*b) an organic acid and an ammonium salt of the organic acid, wherein the ammonium salt and its corresponding acid are selected from the group consisting of: ammonium isobutyrate and isobutyric acid, ammonium butyrate and butyric acid, ammonium propionate and propionic acid, ammonium valerate and valeric acid, ammonium methylbutyrate and methylbutyric acid, and ammonium trimethylacetate and trimethylacetic acid; and*

*c) a nitroaromatic compound selected from the group consisting of 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof,*

*d) wherein the electrolyte has:*

*i) a conductivity in the range of 6.9 to 11.5 mS/cm;*

*ii) a pH in the range of 4.9 to 6.7;*

*iii) an anode breakdown voltage in the range of 370 to 400 volts when the electrolyte is at room temperature and the breakdown voltage is measured using a tantalum anode; and*

*iv) does not generate gas at 105° C.*

*45. The electrolyte of claim 44, wherein the water is present in a range of, by weight, about 1% to about 80%.*

*46. The electrolyte of claim 44, wherein the acid is present in a range of, by weight, about 1% to about 80%.*

*47. The electrolyte of claim 44, wherein the ammonium salt is present in a range of, by weight, 0.5% to about 50%.*

*48. The electrolyte of claim 44, wherein the ammonium salt and its corresponding acid are ammonium isobutyrate and isobutyric acid; and*

*wherein the electrolyte having a pH of 4.9 and an anode breakdown voltage of 395 volts when the electrolyte is at room temperature and the breakdown voltage is measured using a tantalum anode.*

*49. The electrolyte of claim 48, having a conductivity of 7.1 mS/cm.*

*50. The electrolyte of claim 44, wherein the ammonium salt and its corresponding acid are ammonium isobutyrate and isobutyric acid; and*

*wherein the electrolyte having a pH of 5.4 and an anode breakdown voltage of 400 volts when the electrolyte is at room temperature and the breakdown voltage is measured using a tantalum anode.*

*51. The electrolyte of claim 47, having a conductivity of 6.9 mS/cm.*

*52. The electrolyte of claim 44, wherein the ammonium salt and its corresponding acid are ammonium isobutyrate and isobutyric acid; and*

*wherein the electrolyte having a pH of 5.2 and an anode breakdown voltage of 388 volts when the electrolyte is at room temperature and the breakdown voltage is measured using a tantalum anode.*

*53. The electrolyte of claim 52, having a conductivity of 7.9 mS/cm.*

*54. The electrolyte of claim 44, wherein the ammonium salt and its corresponding acid are ammonium isobutyrate and isobutyric acid; and*

*wherein the electrolyte having a pH of 5.7 and an anode breakdown voltage of 380 volts when the electrolyte is at room temperature and the breakdown voltage is measured using a tantalum anode.*

*55. The electrolyte of claim 54, having a conductivity of 11.5 mS/cm.*

*56. The electrolyte of claim 45, wherein the ammonium salt and its corresponding acid are ammonium isobutyrate and isobutyric acid; and*

*wherein the electrolyte having a pH of 6.7 and an anode breakdown voltage of 370 volts when the electrolyte is at room temperature and the breakdown voltage is measured using a tantalum anode.*

*57. The electrolyte of claim 56, having a conductivity of 10.8 mS/cm.*

*58. An electrolyte for a capacitor comprising a tantalum anode, the electrolyte consisting of:*

*a) water;*

*b) an organic solvent selected from the group consisting of glycols, glycol ethers, polyethylene glycols, amides, esters, nitriles, linear carbonates, cyclic carbonates, and mixtures thereof, wherein:*

*i) the glycol is selected from the group consisting of ethylene glycol, diethylene glycol, propylene glycol, trimethylene glycol, and mixtures thereof;*

*ii) the glycol ether is selected from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof;*

*iii) the amide is selected from the group consisting of formamide, dimethyl formamide, diethyl formamide, ethyl formamide, dimethyl acetamide, methyl acetamide, and mixtures thereof;*

*iv) the ester is selected from the group consisting of γ-butyrolactone, γ-valerolactone, N-methyl-2-pyrrolidone, and mixtures thereof;*

*v) the nitrile is selected from the group consisting of acetonitrile, propionitrile, and mixtures thereof; and*

*vi) the linear and cyclic carbonates are selected from the group consisting of dimethyl carbonate, diethyl carbonate, ethyl methyl carbonate, dipropyl carbonate, ethyl propyl carbonate, methyl propyl carbonate, propylene carbonate, ethylene carbonate, butylene carbonate, vinylene carbonate, and mixtures thereof; and*

*c) an organic acid and an ammonium salt of the organic acid, wherein the ammonium salt and its corresponding acid are selected from the group consisting of: ammonium isobutyrate and isobutyric acid, ammonium butyrate and butyric acid, ammonium propionate and propionic acid, ammonium valerate and valeric acid, ammonium methylbutyrate and methylbutyric acid, and ammonium trimethylacetate and trimethylacetic acid; and*

*d) a nitroaromatic compound selected from the group consisting of 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof,*

*e) wherein the electrolyte has:*

*i) a conductivity in the range of 6.9 to 11.5 mS/cm;*

*ii) a pH in the range of 4.9 to 6.7;*

*iii) an anode breakdown voltage in the range of 370 to 400 volts when the electrolyte is at room temperature and the breakdown voltage is measured using a tantalum anode; and*

*iv) does not generate gas at 105° C.*

*59. A capacitor, which comprises:*

*a) an anode of tantalum;*

*b) an electrochemical cathode of ruthenium oxide; and*

*c) an electrolyte for the anode and the cathode, the electrolyte consisting of:*

*i) water;*

*ii) an organic solvent selected from the group consisting of glycols, glycol ethers, polyethylene glycols, amides, esters, nitriles, linear carbonates, cyclic carbonates, and mixtures thereof, wherein:*

*A) the glycol is selected from the group consisting of ethylene glycol, diethylene glycol, propylene glycol, trimethylene glycol, and mixtures thereof;*

*B) the glycol ether is selected from the group consisting of ethylene glycol monomethyl ether, ethylene glycol monoethyl ether, propylene glycol methyl ether, diethylene glycol methyl ether, dipropylene glycol methyl ether, glycol monobutyl ether, and mixtures thereof;*

*C) the amide is selected from the group consisting of formamide, dimethyl formamide, diethyl formamide, ethyl formamide, dimethyl acetamide, methyl acetamide, and mixtures thereof;*

*D) the ester is selected from the group consisting of γ-butyrolactone, γ-valerolactone, N-methyl-2-pyrrolidone, and mixtures thereof;*

*E) the nitrile is selected from the group consisting of acetonitrile, propionitrile, and mixtures thereof; and*

*F) the linear and cyclic carbonates are selected from the group consisting of dimethyl carbonate, diethyl carbonate, ethyl methyl carbonate, dipropyl carbonate, ethyl propyl carbonate, methyl*

*propyl carbonate, propylene carbonate, ethylene carbonate, butylene carbonate, vinylene carbonate, and mixtures thereof; and*

*iii) an organic acid and an ammonium salt of the organic acid, wherein the ammonium salt and its corresponding acid are selected from the group consisting of: ammonium isobutyrate and isobutyric acid, ammonium butyrate and butyric acid, ammonium propionate and propionic acid, ammonium valerate and valeric acid, ammonium methylbutyrate and methylbutyric acid, and ammonium trimethylacetate and trimethylacetic acid;*

*iv) a nitroaromatic compound selected from the group consisting of 2-nitrophenol, 3-nitrophenol, 4-nitrophenol, 2-nitrobenzonic acid, 3-nitrobenzonic acid, 4-nitrobenzonic acid, 2-nitroacetophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and mixtures thereof;*

*v) an additive selected from the group consisting of phosphoric acid, trimethylphosphate, triethylphosphate, and triisopropylphosphate; and*

*vi) wherein the electrolyte has:*

*A) a conductivity in the range of 6.9 to 11.5 mS/cm;*

*B) a pH in the range of 4.9 to 6.7;*

*C) an anode breakdown voltage in the range of 370 to 400 volts when the electrolyte is at room temperature and the breakdown voltage is measured using a tantalum anode; and*

*D) does not generate gas at 105° C.*

*60. The capacitor of claim 59, wherein the ammonium salt and its corresponding acid for the electrolyte are ammonium isobutyrate and isobutyric acid; and*

*wherein the electrolyte has a pH of 4.9 and an anode breakdown voltage of 395 volts when the electrolyte is at room temperature and the breakdown voltage is measured using a tantalum anode.*

*61. The capacitor of claim 60, wherein the electrolyte has a conductivity of 7.1 mS/cm.*

*62. The capacitor of claim 59, wherein the ammonium salt and its corresponding acid of the electrolyte are ammonium isobutyrate and isobutyric acid; and*

*wherein the electrolyte has a pH of 5.4 and an anode breakdown voltage of 400 volts when the electrolyte is at room temperature and the breakdown voltage is measured using a tantalum anode.*

*63. The capacitor of claim 62, wherein the electrolyte has a conductivity of 6.9 mS/cm.*

*64. The capacitor of claim 59, wherein the ammonium salt and its corresponding acid of the electrolyte are ammonium isobutyrate and isobutyric acid; and*

*wherein the electrolyte has a pH of 5.2 and an anode breakdown voltage of 388 volts when the electrolyte is at room temperature and the breakdown voltage is measured using a tantalum anode.*

*65. The capacitor of claim 64, wherein the electrolyte has a conductivity of 7.9 mS/cm.*

*66. The capacitor of claim 59, wherein the ammonium salt and its corresponding acid of the electrolyte are ammonium isobutyrate and isobutyric acid; and*

*wherein the electrolyte has a pH of 5.7 and an anode breakdown voltage of 380 volts when the electrolyte is at room temperature and the breakdown voltage is measured using a tantalum anode.*

*67. The capacitor of claim 66, wherein the electrolyte has a conductivity of 11.5 mS/cm.*

*68. The capacitor of claim 59, wherein the ammonium salt and its corresponding acid of the electrolyte are ammonium isobutyrate and isobutyric acid; and*

*wherein the electrolyte has a pH of 6.7 and an anode breakdown voltage of 370 volts when the electrolyte is at room temperature and the breakdown voltage is measured using a tantalum anode.*

*69. The capacitor of claim 68, wherein the electrolyte has a conductivity of 10.8 mS/cm.*

*70. An electrolyte for a capacitor comprising a tantalum anode, the electrolyte consisting of:*

*a) water;*

*b) ammonium isobutyrate and isobutyric acid; and*

*c) 4-nitrophenol (p-nitrophenol),*

*d) wherein the electrolyte has:*

*i) a conductivity in the range of 6.9 to 11.5 mS/cm;*

*ii) a pH in the range of 4.9 to 6.7;*

*iii) an anode breakdown voltage in the range of 370 to 400 volts when the electrolyte is at room temperature and the breakdown voltage is measured using a tantalum anode; and*

*iv) does not generate gas at 105° C.*

*71. A capacitor, which comprises:*

*a) an anode of tantalum;*

*b) an electrochemical cathode of ruthenium oxide; and*

*c) an electrolyte for the anode and the cathode, the electrolyte consisting of:*

*i) water;*

*ii) an organic solvent;*

*iii) ammonium isobutyrate and isobutyric acid; and*

*iv) 4-nitrophenol (p-nitrophenol),*

*v) wherein the electrolyte has:*

*A) a conductivity in the range of 6.9 to 11.5 mS/cm;*

*B) a pH in the range of 4.9 to 6.7;*

*C) an anode breakdown voltage in the range of 370 to 400 volts when the electrolyte is at room temperature and the breakdown voltage is measured using a tantalum anode; and*

*D) does not generate gas at 105° C.*

* * * * *